(12) United States Patent
Pedrini (10) Patent No.: US 8,444,032 B2
(45) Date of Patent: *May 21, 2013

(54) COLLAPSIBLE VEHICLE-MOUNTED EQUIPMENT CARRIER

(76) Inventor: Fabio Pedrini, Bologna (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,562

(22) Filed: Oct. 3, 2011

(65) Prior Publication Data

US 2012/0018476 A1 Jan. 26, 2012

Related U.S. Application Data

(63) Continuation of application No. 11/853,957, filed on Sep. 12, 2007, now Pat. No. 8,028,878.

(60) Provisional application No. 60/825,461, filed on Sep. 13, 2006.

(51) Int. Cl.
*B60R 9/10* (2006.01)

(52) U.S. Cl.
USPC ............ 224/314; 224/321; 224/505; 224/924

(58) Field of Classification Search ................ 224/572, 224/924, 497, 495, 504, 505, 314, 321; D12/407, D12/408; *B60R 9/10*
See application file for complete search history.

(56) References Cited

U.S. PATENT DOCUMENTS

| | | | |
|---|---|---|---|
| 4,182,467 A | 1/1980 | Graber | |
| 4,830,250 A | 5/1989 | Newbold et al. | |
| 5,056,699 A | 10/1991 | Newbold et al. | |
| 5,118,020 A | 6/1992 | Piretti | |
| 5,135,145 A | 8/1992 | Hannes et al. | |
| 5,195,670 A | 3/1993 | Piretti et al. | |
| 5,363,996 A | 11/1994 | Raaber et al. | |
| 5,377,885 A | 1/1995 | Wyers | |
| 5,495,970 A | 3/1996 | Pedrini | |
| 5,645,202 A | 7/1997 | Kaloustian | |
| 6,000,593 A | 12/1999 | Chimenti | |
| 6,286,738 B1 | 9/2001 | Robins et al. | |
| 6,422,443 B1 | 7/2002 | Erickson et al. | |
| 6,840,418 B2 | 1/2005 | Robins et al. | |
| 7,055,725 B1 | 6/2006 | Kolda | |
| 2002/0117524 A1 | 8/2002 | Jeong | |
| 2006/0138186 A1 | 6/2006 | Pedrini | |
| 2006/0186161 A1 | 8/2006 | Huang | |
| 2010/0127031 A1 | 5/2010 | Sautter et al. | |

*Primary Examiner* — Justin Larson
(74) *Attorney, Agent, or Firm* — Boyle Fredrickson, S.C.

(57) ABSTRACT

A vehicle-mounted equipment carrier includes a hub portion to which is secured a number of vehicle-engaging and equipment-engaging support members. The various support members are each connected to sections of the hub that are movable relative to one another and that include engagement structure to hold the hub sections in desired angular positions with respect to one another. The hub sections can be moved upon disengagement of a clamping mechanism that compresses the hub sections into engagement with one another, and also holds each of the various components of the carrier in connection with one another.

25 Claims, 7 Drawing Sheets

COLLAPSIBLE VEHICLE-MOUNTED EQUIPMENT CARRIER

CROSS-REFERENCE TO RELATED APPLICATION

This application is a continuation of application Ser. No. 11/853,957, filed Sep. 12, 2007, and issued as U.S. Pat. No. 8,028,878, which claims priority from U.S. Provisional Application Ser. No. 60/825,461, filed Sep. 13, 2006, the entirety of which is incorporated herein by reference.

FIELD OF THE INVENTION

This invention relates to a collapsible vehicle-mounted equipment carrier of the type that is typically mounted to the rear of a vehicle, such as to the trunk of tailgate area of a vehicle.

BACKGROUND OF THE INVENTION

Many different types of equipment carriers exist that can be secured to the exterior of a vehicle. These carriers include various configurations with supports that are designed to hold the carrier on the vehicle, and to hold the equipment on the carrier. In many of these configurations, the equipment supports for the carrier can also be reconfigured into different positions such that the carrier can be adapted to hold different items of equipment. Further, the equipment supports and the vehicle-engaging supports can also be moved between a use configuration and a storage configuration in order to allow the carrier to be reconfigured to take up less room for storage than when in use.

However, regardless of the particular structure for the equipment carrier, existing carriers have different shortcomings that make these carriers less than optimal for use with regard to certain vehicles, or with certain types of equipment. Further, in order to reduce the weight of these types of carriers to increase the ease of use of the carrier, the lighter structure often times reduces the structural integrity of the carrier, such that the carrier can be more easily damaged, wears out more quickly or cannot hold the same amount of weight as other, heavier carriers.

Therefore, it is desirable to develop an equipment carrier that can be adjusted into various configurations, including a fully collapsed storage configuration, and which has a construction that enables use of components that provide a relatively light overall weight while maintaining a degree of structural integrity that allows the carrier to support relatively heavy loads.

SUMMARY OF THE INVENTION

According to a first aspect of the present invention, an equipment carrier is provided that includes a hub formed of single structural member to which the vehicle-engaging and equipment-engaging supports for the carrier are connected. The single hub construction provides a more rigid construction to the carrier, such that the carrier can be formed to be lightweight, while also being able to hold equipment types that previously could be held only by heavier carrier designs. The hub is divided into a number of independently movable sections that allow the support connected to the particular hub section to be moved with respect to the remainder of the supports. The sections are releasably locked in engagement with one another to hold the sections in the desired configuration for the carrier.

According to another aspect of the present invention, the hub sections are interconnected with one another through the use of a suitable engagement structure disposed on each of the hub sections. Thus, when the hub sections, and the supports connected thereto, are positioned in a desired position relative to one another, the hub sections can be directly engaged with one another to hold the sections in that position. Also, the ability of the sections, and the supports attached thereto, to be moved with regard to one another allows the carrier to be shifted between various use positions, and into a flat, storage configuration.

Numerous other aspects, features and advantages of the invention will be made apparent from the following detailed description taken together with the drawing figures.

BRIEF DESCRIPTION OF THE DRAWINGS

The drawing figures illustrate the best mode currently contemplated of performing the present invention.

In the drawings.

DETAILED DESCRIPTION OF THE INVENTION

Figure 1:
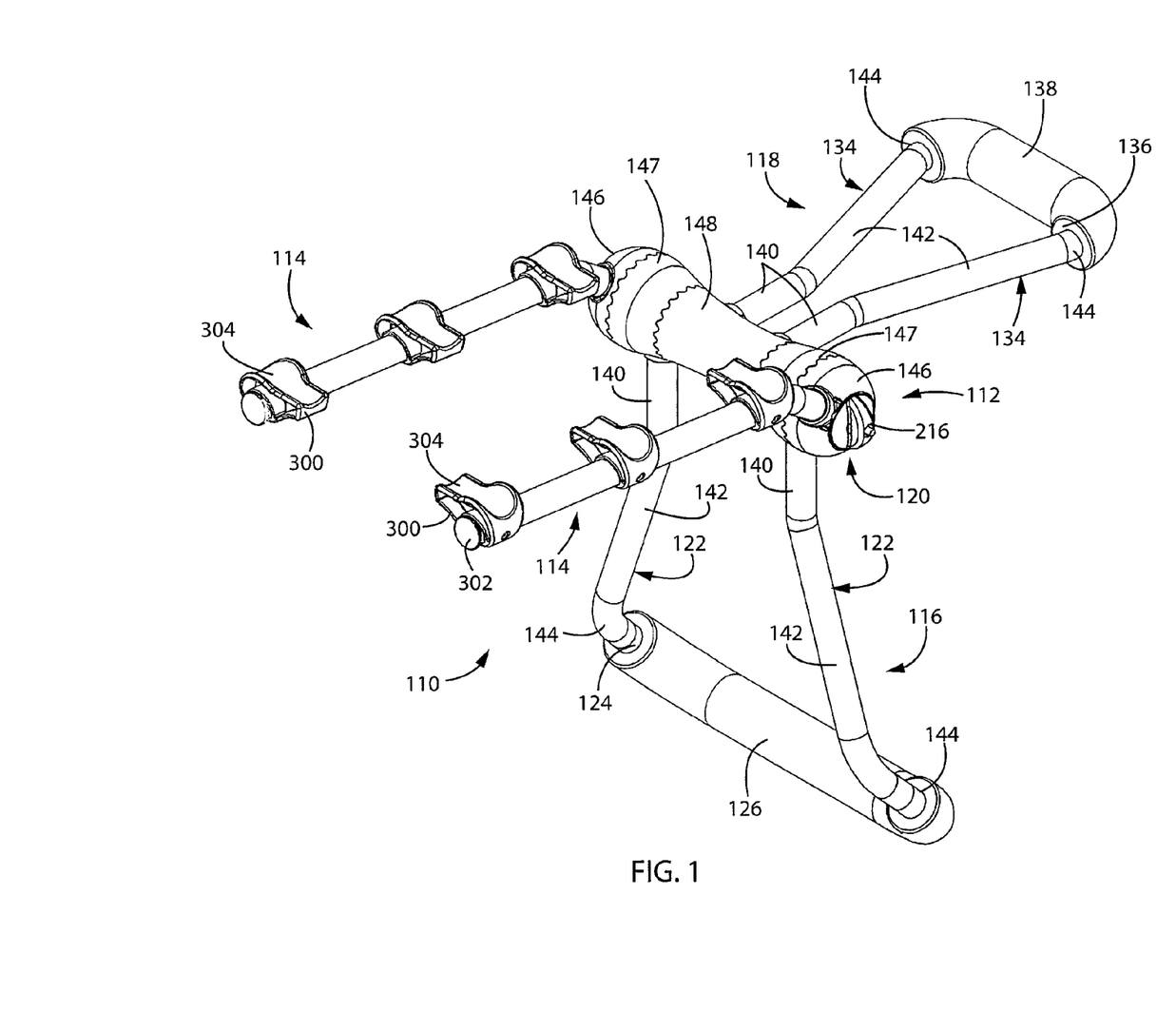
FIG. 1 is an isometric view of the carrier constructed according to the present invention in a use configuration.

With reference now to the drawing figures in which like reference numerals designate like parts throughout the disclosure, a representative embodiment of the present invention is shown in FIG. 1 as a bicycle carrier 110, which includes a frame assembly 112 and an equipment support in the form of a pair of bicycle support members 114, though any number of bicycle support members 114 can also be utilized. Further, while the present invention is illustrated and described with respect to supporting one or more bicycles on bicycle carrier 110 using the bicycle support members 114, it is also understood that the present invention may be used to carry other types of equipment on the exterior of a vehicle, such as skis, snowboards, etc., by using differently configured support components that are adapted to engage such other types of equipment, such as a single support member 114.

As best shown in FIGS. 1-5, a number of bicycle support brackets 300 are positioned on bicycle support member 114. In the illustrated embodiment, bicycle support member 114 is in the form of a tubular member that has a non-circular cross section. Each bicycle support bracket 300 defines a central passage 302 having a shape that corresponds to the cross section of bicycle support member 114, so that bicycle support brackets 300 are in a fixed angular position on bicycle support member 114. Bicycle support brackets 300 may be axially movable along the length of bicycle support member 114 so that brackets 300 can be positioned as desired, or may be fixed in position on bicycle support member 114. In the illustrated embodiment, each bicycle support bracket 300 includes a cradle 304, which is configured to receive and support a bicycle component, such as a tube associated with the bicycle frame, such that the bicycle is supported by the bicycle bracket 300 in a suspension-type manner. While not shown in the drawings, each cradle 304 may include a resilient, soft material that prevents marring or scratching of the bicycle surface, and a strap or other suitable mechanism for clamping the bicycle component against the cradle 304 so as to maintain the bicycle in engagement with support bracket 300 during transit.

Frame assembly 112 includes a first frame section 116 and a second frame section 118. The upper end of first frame section 116 and the inner end of second frame section 118 are interconnected together at a hub 120, which also serves to support the inner end of bicycle support members 114.

First frame section 116 is in the form of a generally U-shaped member, although it is understood that any other satisfactory configuration may be employed. In the illustrated embodiment, first frame section 116 includes a pair of legs 122, the inner ends of which are secured to hub 120 and the outer ends of which are interconnected by a transverse end member 124. In a manner as is known, transverse end member 124 is adapted to rest on the bumper or other transversely extending component of a vehicle. A cushion 126 may be provided about end member 124 for preventing end member 124 from scratching or otherwise marring the vehicle surface.

Legs 122 include upper parallel inner end sections 140 that extend from hub 120, divergent intermediate sections 142, and lower curved end sections 144 that extend between and interconnect end member 124 with the lower ends of the intermediate sections 142, providing the first frame section 116 with a generally triangular shape.

Second frame section 118 is formed similarly to first frame section 116 with a similar triangular configuration, and includes a leg 134 extending from hub 120, and an outer transverse end member 136 that extends from the end of leg 134. End member 136 is adapted to engage a vehicle surface, such as the top of a trunk or a rearwardly facing surface of a tailgate. A cushion 138 may be provided about outer end member 136, for preventing outer end member 136 from scratching or otherwise marring the vehicle surface.

Leg 134 may be formed similarly to legs 122 for first frame section 116, including a longitudinally extending inner end section 140, an outwardly angled intermediate section 142 that extends from the inner end section 140, and a curved outer end section 144 that extends between the end of end member 136 and the end of the intermediate section 142. It is understood that second frame section 118 may take any other satisfactory form, including a T-shaped member or a U-shaped member that extends from hub 120.

Hub 120 is formed in a series of independently movable sections, including a pair of outer sections 146, a pair of mirror image inner sections 147 disposed immediately inwardly from the outer sections 146, and a central hub section 148.

Figure 7:
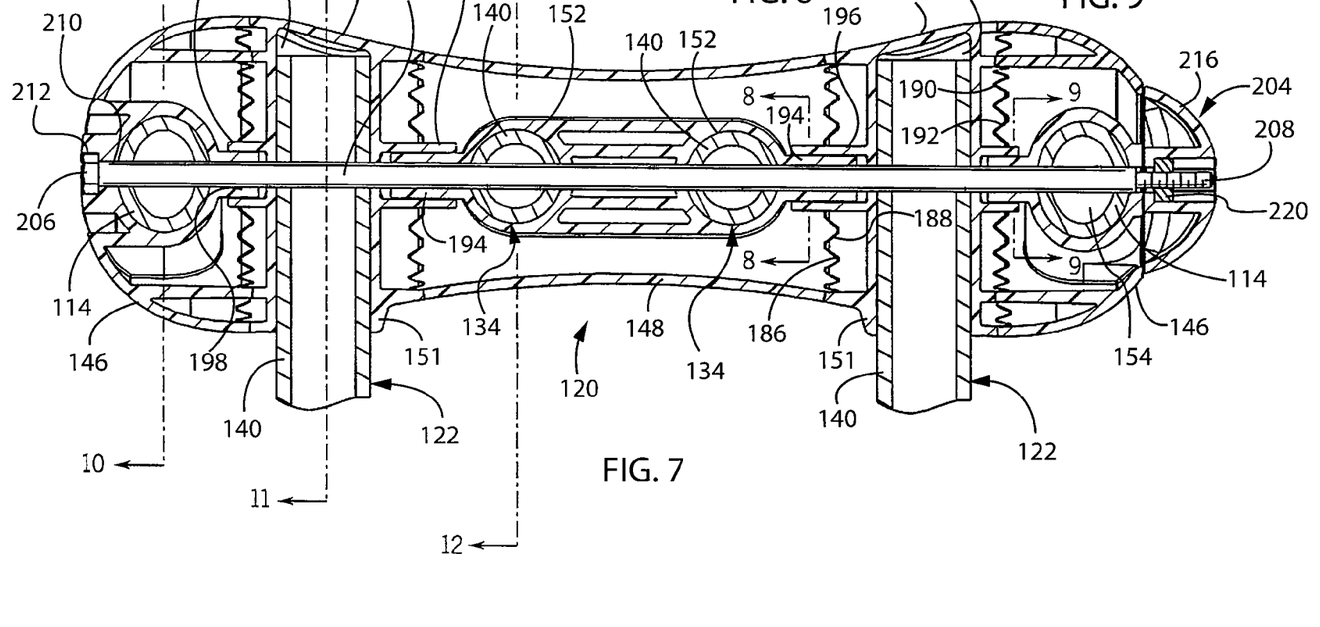
FIG. 7 is a cross-sectional view of the hub of FIG. 6.
Figure 8:
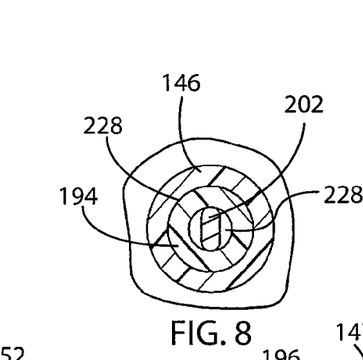
FIG. 8 is a cross-sectional view along line 8-8 of FIG. 7.
Figures 10, 11, 12:
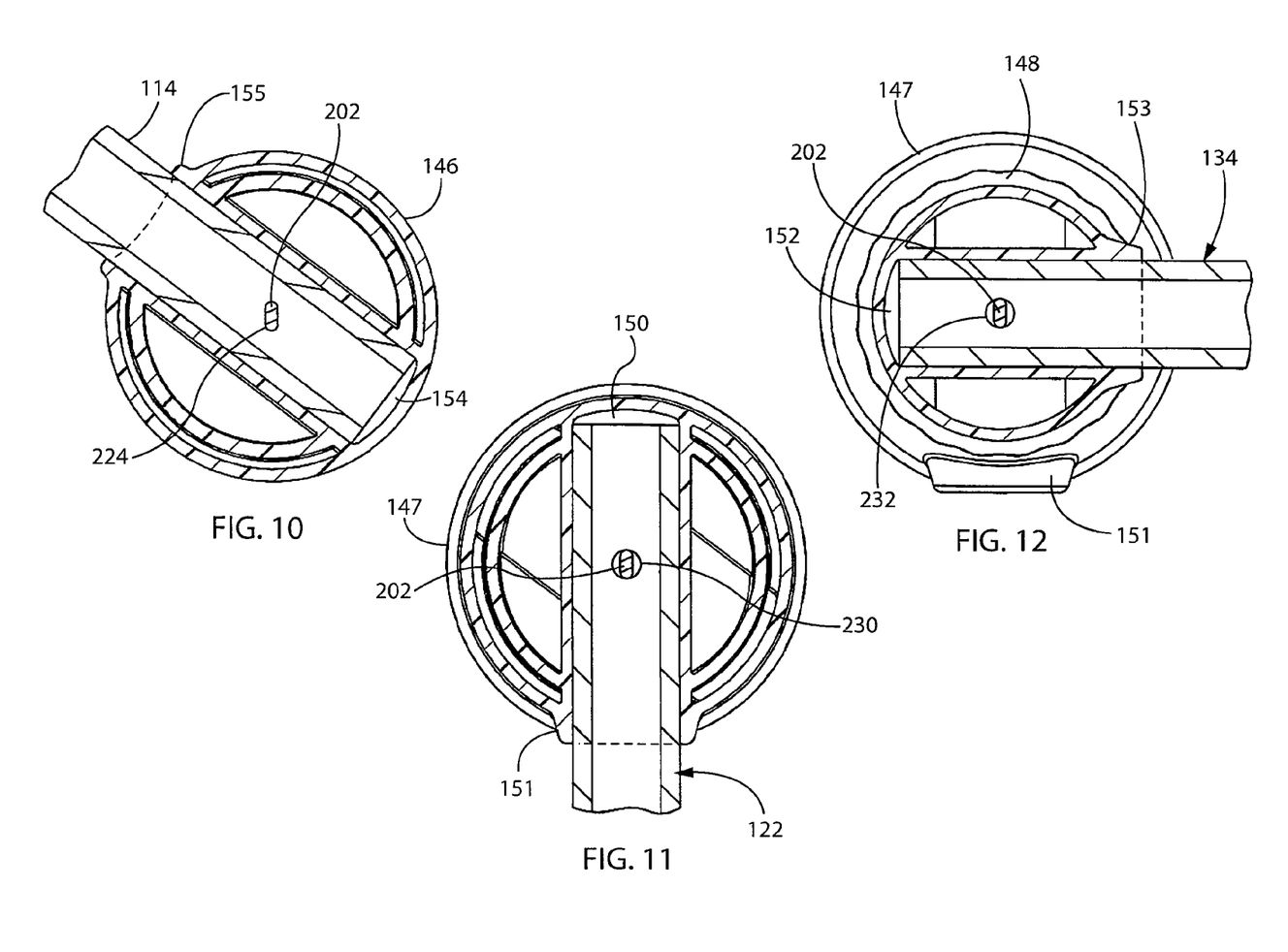
FIG. 10 is a cross-sectional view along line 10-10 of FIG. 7.
FIG. 11 is a cross-sectional view along line 11-11 of FIG. 7.
FIG. 12 is a cross-sectional view along line 12-12 of FIG. 7.

Referring now to FIGS. 7 and 11, the inner end section of each first frame section leg 122 is rigidly secured to one of inner hub sections 147. Representatively, the end of each inner end section 140 may extend into a passage 150 formed in the adjacent inner hub section 147, and which can include a collar 151 or other satisfactory reinforcing structure, such that the angular position of first frame section 116 relative to hub 120 is fixed.

Figure 6:
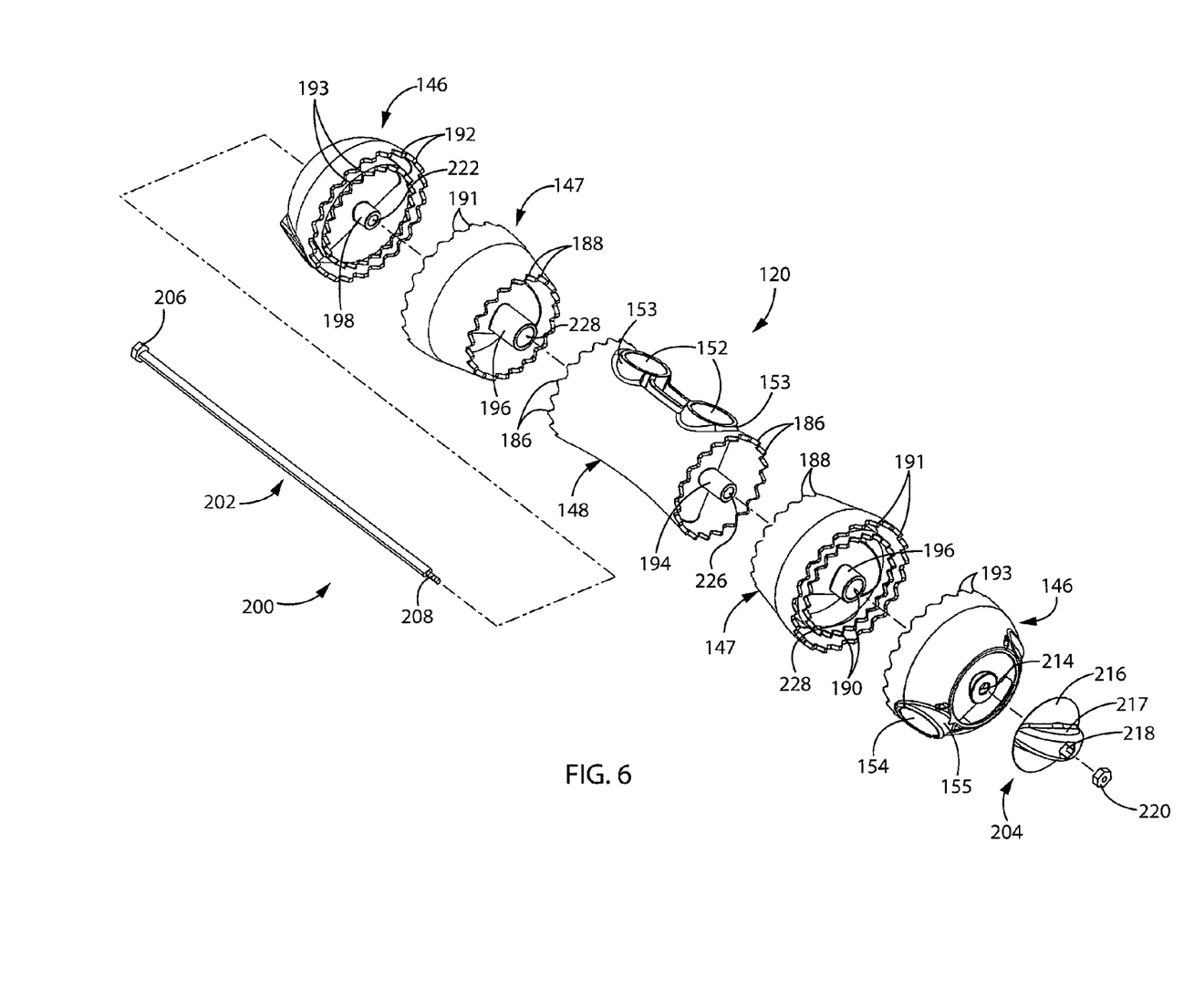
FIG. 6 is an exploded, isometric view of the hub of the carrier of FIG. 1.

Looking now at FIGS. 6 and 12, the inner end section 140 of each second frame section leg 134 is rigidly secured to central hub section 148. Representatively, the inner end of leg 134 may extend into a passage 152 formed in central hub section 148 through a collar 153 or other satisfactory reinforcing structure, such that the angular position of first frame section 118 relative to central hub section 148 is fixed.

As best shown in FIGS. 7 and 10, the outer hub sections 146 each include a passage 154 extending partially therethrough within which one end of the bicycle support members 114 can be inserted. The inner end of the support member 114 may extend into the passage 154 formed in outer hub section 146 through a collar 155 or other satisfactory reinforcing structure, such that the angular position of support member 114 relative to outer hub section 146 is fixed.

Figure 2:
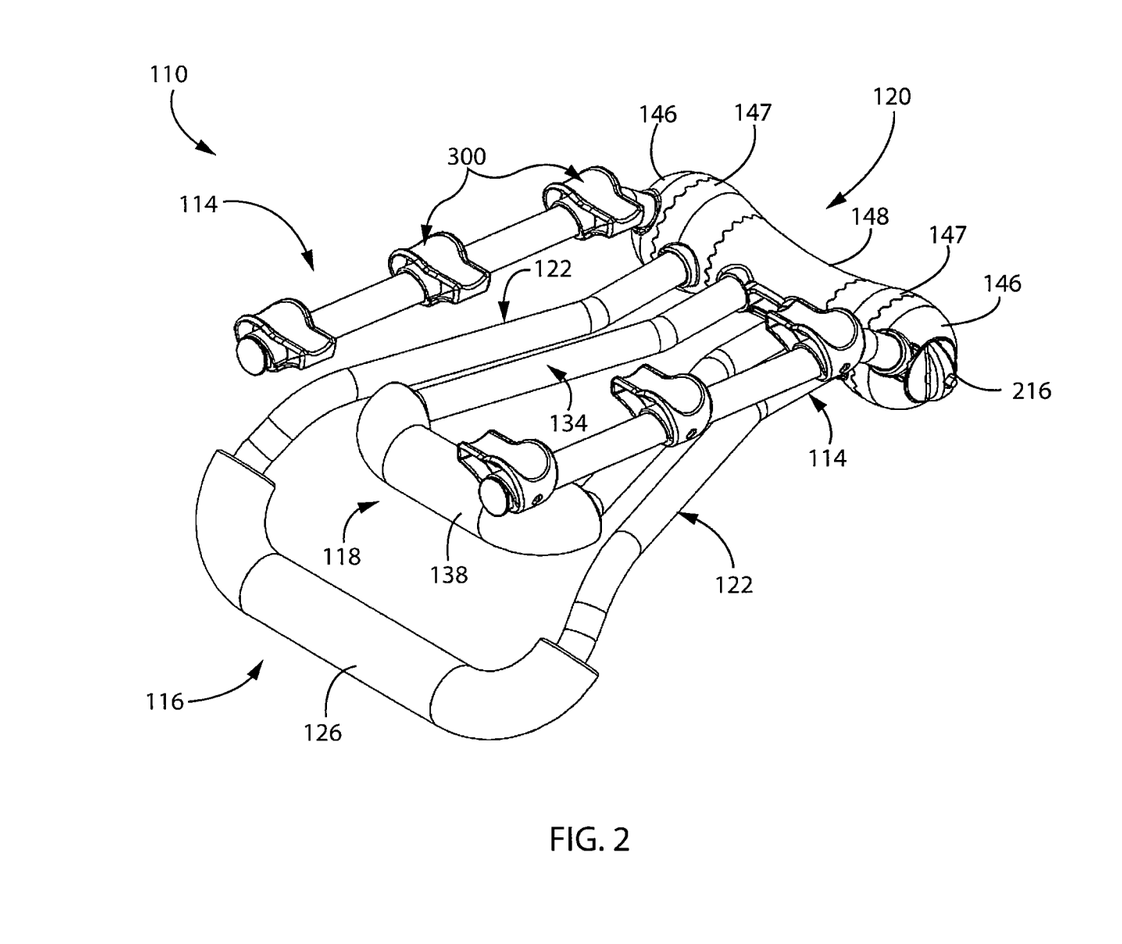
FIG. 2 is an isometric view of the carrier of FIG. 1 in a flat, storage configuration.
Figures 3, 4:
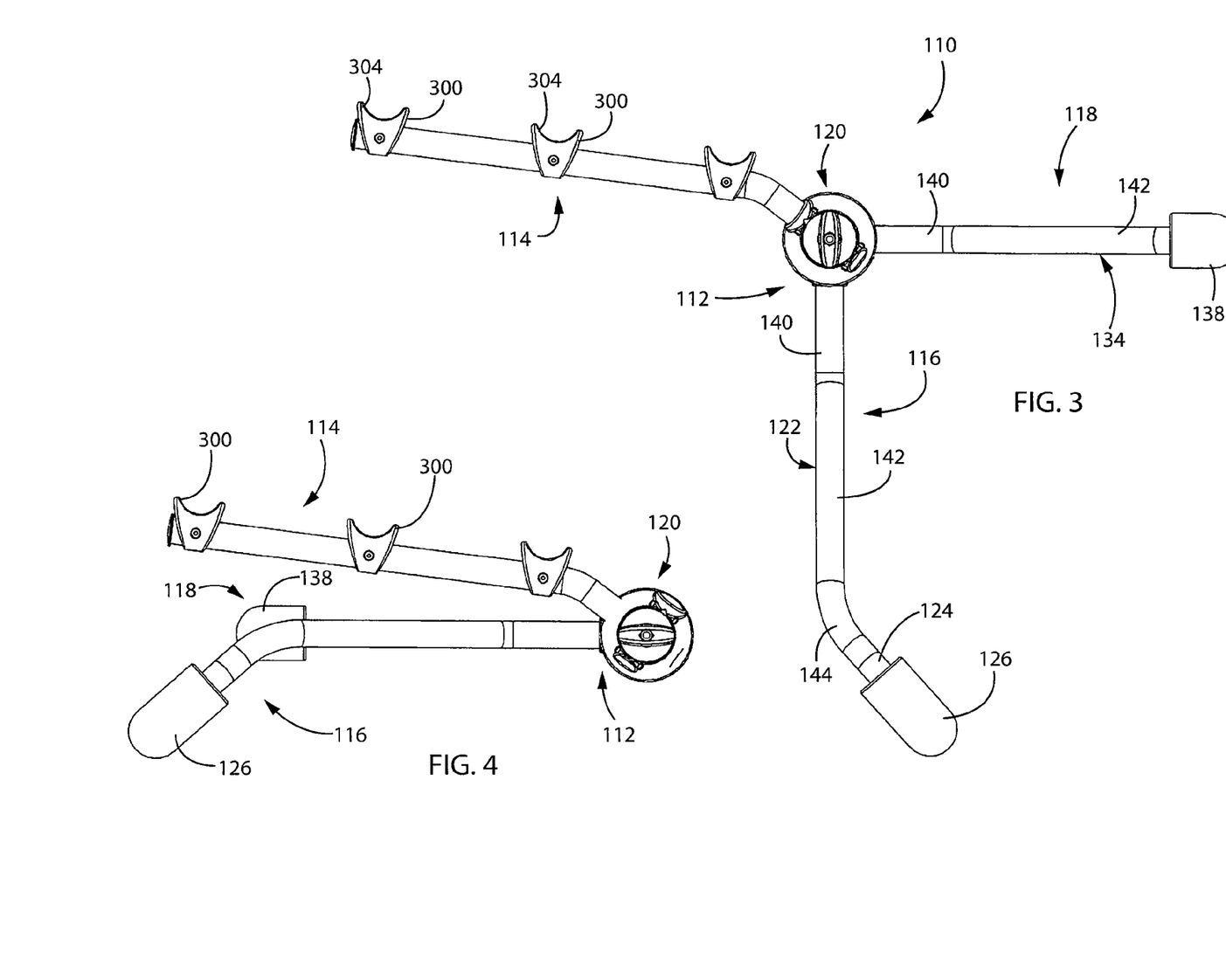
FIG. 3 is a right side elevation view of the carrier of FIG. 1.
FIG. 4 is a right side elevation view of the carrier of FIG. 2.
Figure 5:
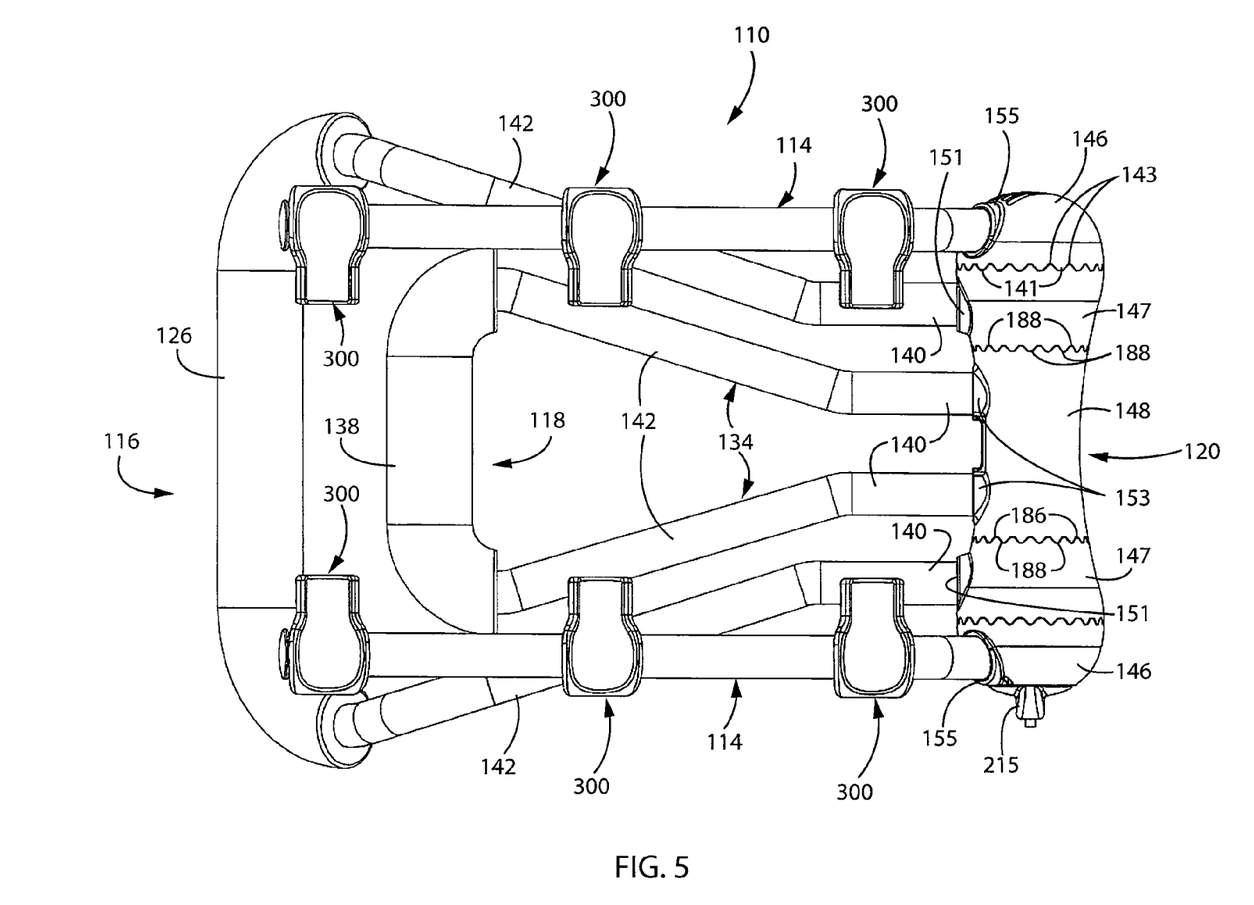
FIG. 5 is a top plan view of the carrier of FIG. 2.

Central hub section 148 can be moved to varying angular positions relative to outer hub sections 146 and inner hub sections 147, which enables second frame section 118 to be positioned in a variety of angular positions relative to the first frame section 116. Second frame section 118 can be moved to an inoperative or collapsed position for storage, as best shown in FIGS. 2, 4 and 5, in which second frame section 118 is generally coplanar with the upper area of first frame section 116. Second frame section 118 can then be moved to a variety of different angular use positions, to orient second frame section 118 in a desired angular position for the type of vehicle to which bicycle carrier 110 is mounted, as best shown in FIGS. 1 and 3.

Looking now at the carrier 110 as illustrated in FIGS. 6-12, the angular position of central hub section 148, and thereby second frame section 118, is selectively fixed by means of a series of oppositely facing teeth 186 on central hub section 148 that are selectively engageable with facing, inwardly extending teeth 188 formed on the inner hub sections 147, as best shown in FIGS. 6 and 7. Central hub section teeth 186 and inner hub section teeth 188 selectively mesh together to engage and secure central hub section 148 in a desired angular position, when central hub section 148 is clamped in a desired position between inner hub sections 147.

When the inner hub sections 147 are disengaged from the central section 148, the inner hub sections 147 are maintained in axial alignment with the central section 148 by a pair of hollow stub shafts 194 disposed at opposite ends of the central hub section 148 concentrically with respect to the teeth 186. The shafts 194 extend outwardly from the central section 148 and are received within sleeves 196 disposed on the inner hub sections 147 adjacent the central section 148 and concentrically with respect to the teeth 188. The sleeves 196 have an inner diameter slightly larger than the outer diameter of the shafts 194 such that the shafts 194 can rotate freely within the sleeves 196. Also, the length of each of the shafts 194 and the sleeves 196 is sufficient that, when the inner hub sections 147 are disengaged from the central section 148, the shafts 194 remain at least partially engaged within the sleeves 196 to maintain the axial alignment of the inner hub sections 147 and the central hub section 148.

The angular position of outer hub sections 146, and thereby each of the bicycle support members 114, is selectively fixed by means of a series of oppositely facing teeth 190 and 191 on the inner hub section 147 that are disposed opposite teeth 188 and are selectively engageable with facing, inwardly extending teeth 192 and 193 formed on the outer hub sections 146. The inner hub section teeth 190 and 191, and outer hub section teeth 192 and 193, respectively, selectively mesh together to engage and secure the outer hub sections 146 in a desired angular position with respect to each of the inner hub sections 147 and the central hub section 148, when central the outer hub sections 146 are clamped in a desired position into engagement with the inner hub sections 147. The dual sets of teeth 190-191 and 192-193 on the respective hub sections 146 and 147 provide enhanced positioning strength to the bicycle support members 114 which bear the entire weight of the equipment loaded thereon.

Also, in order to maintain the axial alignment of the outer hub sections 146 and the inner hub sections 147 when the inner hub sections 147 are disengaged from the outer hub sections 146, similarly to the central section 148, the outer hub sections 146 each include a hollow stub shaft 198 disposed concentrically with respect to the teeth 192 and 193 on each outer hub section 146. The shafts 198 extend outwardly from the outer hub sections 146 and are received within the ends of the sleeves 196 disposed on the inner hub sections 147 opposite the central section 148. The shafts 198 are formed similarly to the shafts 194, such that the shafts 198 can rotate freely within the sleeves 196. Also, the length of each of the shafts 198 and the sleeves 196 is sufficient that, when the outer hub sections 147 are disengaged from the inner hub sections 147, the shafts 198 remain at least partially engaged within the sleeves 196 to maintain the axial alignment of the inner hub sections 147 and the outer hub sections 146.

The hub sections 146-148 may be engaged together to fix the position of the various hub sections 146-148 with respect to one another in any satisfactory manner. However, in the preferred embodiment illustrated in the drawing figures, to clamp the various sections 146-148 of the hub 120 into engagement with one another at the desired position, the frame assembly 112 of the carrier 110 includes a clamping mechanism 200 that is disposed within the hub 120. The clamping mechanism 200 is formed of a central pin 202 and an engagement member 204, best shown in FIGS. 6 and 7. The pin 202 is generally in the form of an elongated bolt, which is formed with a stop 206 at one end and a threaded portion 208 at the opposite end. When each of the various sections 146-148 of the hub 120 are engaged with one another, the pin 202 can be inserted through an axial opening 210 in one of the outer hub sections 146 and extends through each of the various sections 146-148 along the axis defined by the hollow shafts 194 and 198 and the sleeves 196 in the various portions 146-148 of the hub 120. When the pin 202 is fully inserted through the shafts 194 and 198 and the sleeves 196, the stop 206 is completely retained within a notch 212 formed in the exterior surface of the outer hub section 146 in communication with the opening 210, and the threaded portion 208 extends outwardly from the axial opening 214 defined within the opposite outer hub section 146.

To hold the pin 202 in this position, the threaded portion 208 is engaged by the engagement member 204. The engagement member 204 includes a head 216, which may be formed with recesses 217 that can easily be grasped by an individual to rotate the head 216, with the head 216 including a central aperture 218 defined therein. A nut or other suitable locking member 220 is disposed within the aperture 218 and is engageable with the threaded portion 208 of the pin 202 to fix the head 216 to the pin 202. Preferably the aperture 218 is shaped to conform to the shape of the locking member 220, such that the locking member 220 cannot rotate independently of the head 216. Further, due to the engagement of the stop 206 in the notch 212, by rotating the head 216 to move the nut 220 along the threaded portion 208, the head 216 can compress the various hub sections 146-148 into engagement with one another to secure the sections in the desired angular positions with respect to one another. In this manner, the user can vary the positions of the bicycle support members 114, the first frame section 116 and the second frame section 118 according to the configuration of the vehicle to which bicycle carrier 110 is to be mounted, or to position the bicycle support member 114 and frame sections 116, 118 together in a collapsed configuration for storage. When the frame sections 116, 118 and support members 114 are in the desired position, the user then tightens the clamping mechanism 200 by rotation of head 216, which draws hub sections 146-148 together by movement of the head 216 along the threaded portion 208 toward the stop 206. This functions to clamp the hub sections 146-148 and the teeth 186-193 thereon in engagement with each other in the desired configuration for the carrier 110.

The positioning of the stop 206 within the notch 212 also enables the sections 146-148 to be angularly adjusted relative to one another without completely disassembling the frame assembly 112. This is due to the configuration of the threaded portion 208 of the pin 202, which is formed to have a length longer that the length of the teeth 186-193 on the various hub sections 146-148. Thus, when the head 216 is rotated to move the locking member 220 away from the hub 120, the length of the threaded portion 208 enables the head 216 and locking member 220 to remain engaged with the threaded portion 208 at a position that also enables the various teeth 188-193 to be disengaged from one another. Once disengaged, the hub sections 146-148 can be rotated with regard to one another into the desired configuration, all while being maintained on the pin 202. Once the desired configuration is reached, the head 216 can be used to re-engage the teeth 188-193 with one another to fix the hub sections 146-148 together. This process of adjusting the relative positions of the hub sections 146-148 is also facilitated by the length of the shafts 194, 198 and the sleeve 196 for the reasons described previously.

Figure 9:
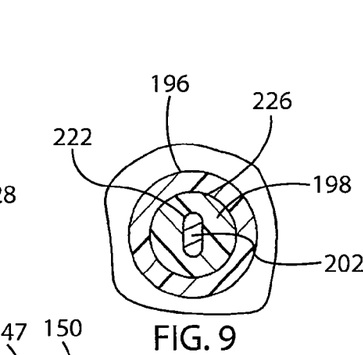
FIG. 9 is a cross-sectional view along line 9-9 of FIG. 7.

Referring now to FIGS. 6-12, the pin 202 is formed with a generally rectangular cross-section between the stop 206 and the threaded portion 208. This cross-section enables the pin 202 to be securely engaged by the shafts 198 on each of the outer hub sections 146, as best shown in FIGS. 7 and 9. The shafts 198 are formed with passages 222 extending therethrough that correspond in shape to the cross-section of the pin 202. With this construction, the engagement of the rectangular pin 202 with the mating rectangular passages 222 functions to maintain the outer hub sections 146 in the same predetermined angular position relative to pin 202, and therefore relative to each other. It is understood that the cross section of pin 202 and the passages 222 may have any other non-circular cross-section that maintains outer hub sections 146 in non-rotational engagement with pin 202.

In addition, as illustrated in FIGS. 7 and 10, the ends of the bicycle support members 114 are formed with apertures 224 on each side, that are aligned with the channel 222 in the shaft 194 when the support members 114 are fully inserted within the outer hub sections 146. The apertures 224 have a shape that corresponds to that of passages 222 and pin 202, so that the pin 202 is engaged directly with both the outer hub sections 146 and the bicycle support members 114. The fixed angular position of the outer hub sections 146 on the pin 202 ensures that the support members 114 rotate in conjunction with one another relative to the inner hub sections 147 and the central hub section 148. In other words, when the angular position of one of the bicycle support members 114 and the corresponding outer hub section 146 is being adjusted relative to the remaining hub sections 147 and 148, the position of the other outer hub section 146 and bicycle support member 114 is simultaneously adjusted to the same position.

Conversely, as best shown in FIGS. 7, 8, 11 and 12, each of the shafts 194 on the inner hub sections 147 and the sleeve 196 on the central hub section 148 are formed with generally circular passages 226 and 228, respectively, that enable the pin 202 to rotate independently of these hub sections 147 and 148. Also, the end sections 140 of the various legs 122 and 134 for the first and second frame sections 116 and 118 are formed with circular apertures 230 and 232, respectively. These apertures 230 and 232 are aligned with the respective passages 226 and 228 when the end sections 140 are fully inserted into the passages 150 and 152, such that the pin 202 can rotate freely within each of the hub sections 147 and 148 without changing the position of the sections 147 and 148. In addition, because the pin 202 extends through each of the respective hub sections 146-148, and through each of the bicycle support members 114, the first frame member 116 and the second frame member 118, the pin 202 and head 216 operate to hold all of the various components of the carrier 110 together in a single piece construction.

In another embodiment for the clamping mechanism 200, the engagement member 204 can be replaced with a quick release lever (not shown) pivotably secured to the end of the pin 202 opposite the stop 206. The operation of the lever is akin to that of a quick release bicycle skewer, and selectively enables the hub sections 146-148 to be moved together and apart, in a manner as is known, by selective engagement with and disengagement of the lever from the exterior surface of the outer hub sections 146 adjacent the lever.

Further, it is also contemplated that the first and second frame sections can be secured to the hub 120 using other means. For example, in one alternative embodiment, one or both of the inner hub sections 147 and the central hub section 148 can include pivot brackets (not shown) with suitable stops (not shown) to which one of inner end sections 40 of the first frame section legs 122 of the second frame section legs 134 can be pivotably mounted. In another alternative embodiment, one or both of the first frame section 116 or the second frame section 118 may be mounted to hub 120 via a variable position engagement arrangement (not shown) that enables one of the first frame section 116 or the second frame section 118 to be moved to a variety of angular positions relative to hub 120, and to the remaining frame section 116 or 118, such as by utilizing a spring-biased, ratchet-type construction on the carrier hub 120.

Bicycle carrier 110 is secured in position on the rear of the vehicle in any conventional manner, such as by use of a series of straps and hooks or any other satisfactory mounting system.

It can thus be appreciated that the present invention provides an equipment carrier that is relatively compact in its construction, yet which is capable of effectively mounting bicycles or other equipment to the rear of a vehicle in a secure manner. The carrier can be quickly and easily reconfigured, and can be fully collapsed for storage when not in use.

While the invention has been shown and described with respect to a specific embodiment, it is contemplated that various alternatives and modifications are contemplated as being within the scope of the invention. For example, the present invention may utilize other frame and equipment support configurations in combination with the multi-section hub construction as shown and described. In one representative alternative embodiment, the hub is formed of three sections. A single equipment support member extend from a central one of the hub sections. The two vehicle-engaging frame members are secured to the outer hub sections. Representatively, a fixed, generally U-shaped frame member has a pair of ends, each of which is engaged with one of the outer hub sections using a fixed connection. An outer support member is located outwardly of the pair of ends, and is configured to engage the vehicle and a first location, such as on the bumper or on the trunk or tailgate of the vehicle. Another generally U-shaped frame member also extends from the outer hub sections. This frame member also has a pair of ends, and a movable connection, such as a pivot connection, may be positioned between the outer hub sections and the ends of the frame member in order to enable the frame member to be adjusted so as to vary the angle between the frame members, and to enable the frame members to be moved to a collapsed position for storage. The single equipment support member may carry a number of equipment support members, which are formed with spaced apart engagement areas which support the equipment in a suspension-type manner. In another embodiment, the frame member that extend from either the central hub section may have a single point of connection with the central hub member. In this embodiment, the frame member has an inner end that extends from the central hub section, and an outer end having a transverse area that is adapted to engage a surface of the vehicle. In another alternative embodiment, the pair of equipment support members may be freely rotatable relative to the clamping pin. The facing surfaces of each of the outer and inner hub sections may be formed with recesses which together cooperate to define a passage within which an inner area of one of the equipment support members is received. When the hub sections are disengaged, the equipment support members can be rotated for engagement with selected ones of the facing recesses. When the hub sections are clamped together, the equipment support members are maintained within the recesses so as to maintain the equipment support members in a desired angular position relative to the frame members.

Various alternatives are contemplated as being within the scope of the following claims, which particularly point out and distinctly claim the subject matter regarded as the present invention.

I claim:

1. An equipment carrier adapted for mounting to a vehicle, comprising:
    a transversely extending hub that includes a pair of outer sections and a central section extending the entire distance between the pair of outer sections, wherein the central section defines a pair of oppositely facing ends, each of which faces one of the outer sections;
    a frame interconnected with the hub for mounting the equipment carrier to a vehicle; and
    a pair of spaced apart rotatable equipment support members interconnected with and extending from the hub and adapted to support one or more items of equipment, wherein a first one of the support members is located toward a first end of the hub and a second one of the support members is located toward a second end of the hub.

2. The equipment carrier of claim 1, wherein the pair of spaced apart equipment support members are rotatably linked together so as to be rotatable together relative to the hub between a raised position and a lowered position.

3. The equipment carrier of claim 1, wherein the hub includes a variable position engagement arrangement for selectively locking the position of the equipment support members relative to the frame.

4. The equipment carrier of claim 3, wherein the variable position engagement arrangement is interposed between the central hub section and the outer hub sections, and wherein the frame includes at least one frame member that extends from the central hub section and wherein the equipment support members extend from the pair of outer hub sections.

5. The equipment carrier of claim 1, wherein the frame comprises a first frame portion configured to engage the vehicle in a first location and a second frame portion configured to engage the vehicle in a second location.

6. The equipment carrier of claim 5, wherein the first and second frame portions comprise respective first and second frame members that are coupled to and extend from the hub.

7. The equipment carrier of claim 5, wherein the first frame portion and the second frame portion are interconnected with the hub by a variable position engagement arrangement.

8. A method for adjusting the configuration of a vehicle-mounted equipment carrier, the method comprising the steps of:
providing an equipment carrier including a hub including a number of relatively movable sections, wherein the hub sections include a pair of outer sections and a central section extending the entire distance between the pair of outer sections, wherein the central section defines a pair of oppositely facing ends, each of which faces one of the outer sections; a first frame member interconnected with the hub and constructed to engage a vehicle at a first location; a second frame member interconnected with the hub and constructed to engage the vehicle at a second location; a pair of equipment support members extending from the hub and adapted to support one or more items of equipment; and an axially movable clamping arrangement engaged with the hub sections for selectively clamping the hub sections together to prevent movement of the pair of equipment support members, and for selectively releasing the hub sections to enable movement of the pair of equipment support members relative to the first and second frame members;
disengaging the clamping arrangement from the hub sections;
moving the equipment support members relative to the frame members between a raised position and a lowered position; and
re-engaging the clamping arrangement with the hub sections to prevent movement of the equipment support members.

9. The method of claim 8 wherein the clamping arrangement includes a pin extending through the hub sections and a compression member engaged with the pin adjacent the hub sections, and releasably engageable with the hub sections, and wherein the step of disengaging the variable position engagement arrangement comprises moving the compression member relative to the pin.

10. The method of claim 8 wherein the hub sections are axially aligned, and wherein each hub section includes engagement structure that is releasably engageable with aligned engagement structure on adjacent hub sections, and wherein the step of disengaging the clamping arrangement comprises moving the engagement structure of the adjacent hub sections out of engagement with one another.

11. The method of claim 8, wherein the equipment support members are rotatably linked together, and wherein the step of moving the equipment support members is carried out by moving the equipment support members in unison relative to the frame members.

12. An equipment carrier adapted for mounting to a vehicle, comprising:
a transversely extending hub that includes a pair of outer sections and a central section extending the entire distance between the pair of outer sections, wherein the central section extends along a longitudinal axis;
a frame interconnected with the hub and configured to engage a vehicle for mounting the equipment carrier to the vehicle;
a pair of spaced apart equipment support members rotatably interconnected with and extending from the hub and adapted to support one or more items of equipment, wherein the spaced apart equipment support members are rotatable relative to the hub about a pivot axis defined by the longitudinal axis of the central section of the hub; and
a selectively operable locking arrangement interconnected between the hub and the pair of spaced apart equipment support members, wherein the selectively operable locking arrangement is movable between a locking configuration to selectively fix the rotational position of the equipment support members relative to the hub, and an unlocking configuration to enable rotational movement of the equipment support members relative to the hub.

13. The equipment carrier of claim 12, wherein the equipment support members are rotatably linked together so as to be rotatable together relative to the hub.

14. The equipment carrier of claim 12, wherein the equipment support members are interconnected with each other via a cross member that extends along the pivot axis, wherein the cross member and the equipment support members include engagement structure that maintains the equipment support members in a constant angular position relative to each other and relative to the cross member.

15. The equipment carrier of claim 12, wherein the frame comprises a first frame portion interconnected with the hub and configured to engage a vehicle at a first location, and a second frame portion interconnected with the hub and configured to engage the vehicle at a second location spaced from the first location.

16. The equipment carrier of claim 12, wherein the hub comprises a number of relatively movable sections, and wherein the frame comprises a first frame member extending from a first section of the hub and constructed to engage a vehicle at a first location; a second frame member extending from a second section of the hub and constructed to engage the vehicle at a second location; and wherein the equipment support member extends from a third section the hub.

17. The equipment carrier of claim 16, wherein the first, second and third sections of the hub are each relatively movable with respect to one another.

18. The equipment carrier of claim 17, wherein the third sections of the hub are disposed at opposite ends of the hub, and wherein the pair of equipment support members extend from the third sections, wherein the third sections and the equipment support members are rotatable together.

19. The equipment carrier of claim 17, wherein the first, second and third sections of the hub each include engagement structure that is releasably engageable with aligned engagement structure on the adjacent hub sections.

20. The equipment carrier of claim 19, wherein the engagement structure comprises meshing teeth.

21. The equipment carrier of claim 20, wherein the selectively operable locking arrangement further comprises a releasable clamping member engaged with the hub sections to selectively secure the hub sections together.

22. The equipment carrier of claim 21, wherein the clamping member extends axially through each of the hub sections.

23. The equipment carrier of claim 22, wherein the frame comprises a first frame portion interconnected with the hub and configured to engage a vehicle at a first location and a second frame portion interconnected with the hub and configured to engage the vehicle at a second location spaced from the first location, and wherein the clamping member extends through each of the first frame portion, second frame portion and the equipment support members.

24. The equipment carrier of claim 22, wherein the clamping member includes a pin extending through the hub sections, and further comprising a compression member engaged with the pin adjacent an outer one of the hub sections, wherein the pin and the clamping member function to secure the hub sections together.

25. The equipment carrier of claim 22 wherein the first and second hub sections are rotatable about the clamping member.

\* \* \* \* \*

UNITED STATES PATENT AND TRADEMARK OFFICE
CERTIFICATE OF CORRECTION

PATENT NO. : 8,444,032 B2
APPLICATION NO. : 13/251562
DATED : May 21, 2013
INVENTOR(S) : Fabio Pedrini Page 1 of 1

It is certified that error appears in the above-identified patent and that said Letters Patent is hereby corrected as shown below:

IN THE CLAIMS

CLAIM 16, column 10, line 36, after "section" insert -- of --.

Signed and Sealed this
Twenty-fifth Day of June, 2013

Teresa Stanek Rea
*Acting Director of the United States Patent and Trademark Office*